ised is apparatus for introducing particulate material into a vessel having a gas pressure different from atmospheric pressure.

United States Patent [19]

Stock et al.

[11] 4,089,429
[45] May 16, 1978

[54] APPARATUS FOR INTRODUCING PARTICULATE MATERIAL INTO A VESSEL

[75] Inventors: Arthur J. Stock, Lakewood; Reeve R. Hastings, Chagrin Falls, both of Ohio

[73] Assignee: Stock Equipment Company, Cleveland, Ohio

[21] Appl. No.: 795,161

[22] Filed: May 9, 1977

[51] Int. Cl.² .............................................. F27B 1/20
[52] U.S. Cl. ................................ 214/35 R; 48/86 R; 141/280
[58] Field of Search ................ 214/17 B, 17 C, 35 R; 202/262, 263; 48/86 R; 141/67, 280, 392; 432/95

[56] References Cited
U.S. PATENT DOCUMENTS

| | | | |
|---|---|---|---|
| 3,315,824 | 4/1967 | Kirchhoefer | 214/17 B |
| 3,799,367 | 3/1974 | Grewer et al. | 214/17 B X |
| 4,033,730 | 7/1977 | Baron et al. | 202/262 X |

*Primary Examiner*—Albert J. Makay
*Attorney, Agent, or Firm*—Bosworth, Sessions & McCoy

[57] ABSTRACT

Disclosed is apparatus for introducing particulate material, such as finely divided coal, into a vessel, such as a coal gasifier, having a gas pressure different from atmospheric pressure, comprising a gas lock chamber having at each of its feed and discharge ends an openable and closable material-holding valve below which is a movable openable and closable gas sealing valve, and means below the gas sealing valve for clearing away particulate material from the space through which the sealing valve moves from its opened position to its closed position, to insure that a tight gas seal can be achieved. Also disclosed is a gas valve having a seat radially spaced from the conduit through which material is distributed, to aid in gas sealing. Systems are also disclosed for automatically controlling the pressure in the gas lock chamber to enable it to act as a gas lock, and the operation of the various material holding and gas sealing valves, and clearing means.

32 Claims, 18 Drawing Figures

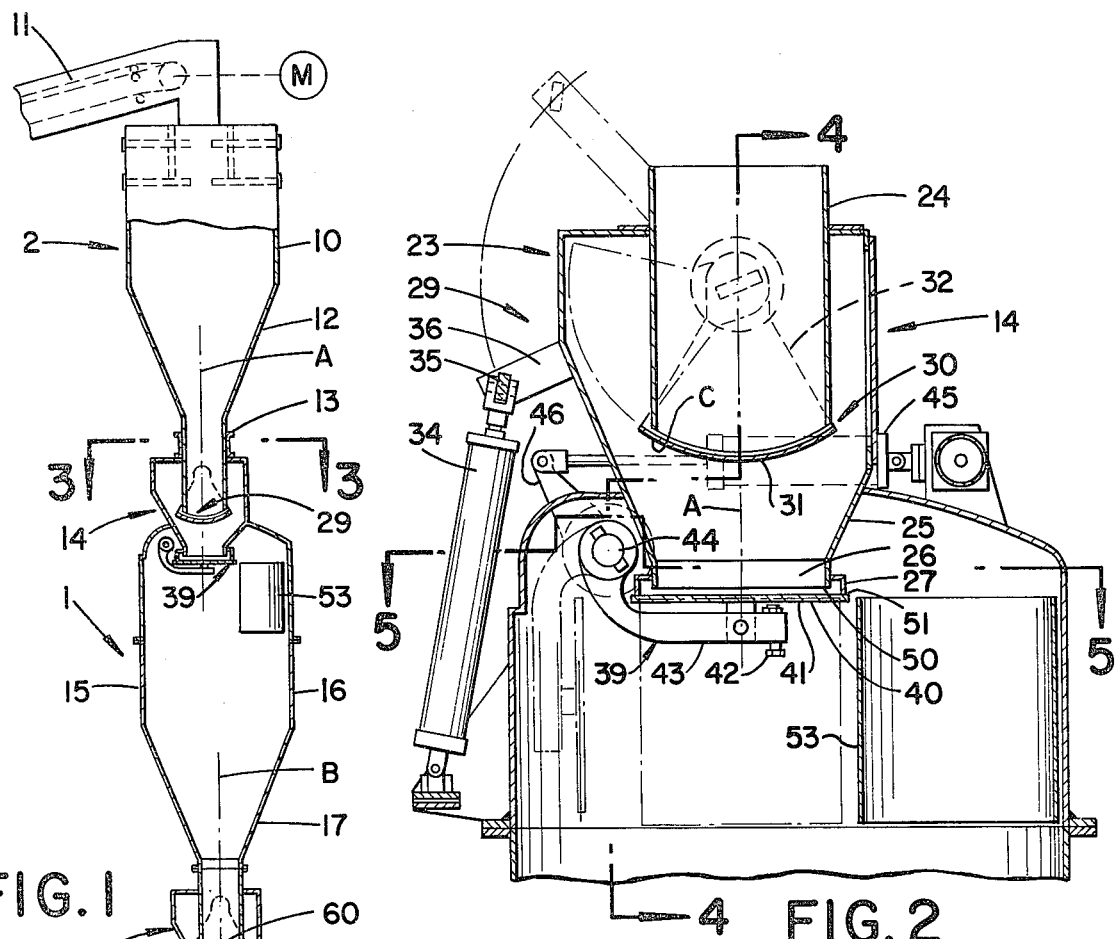
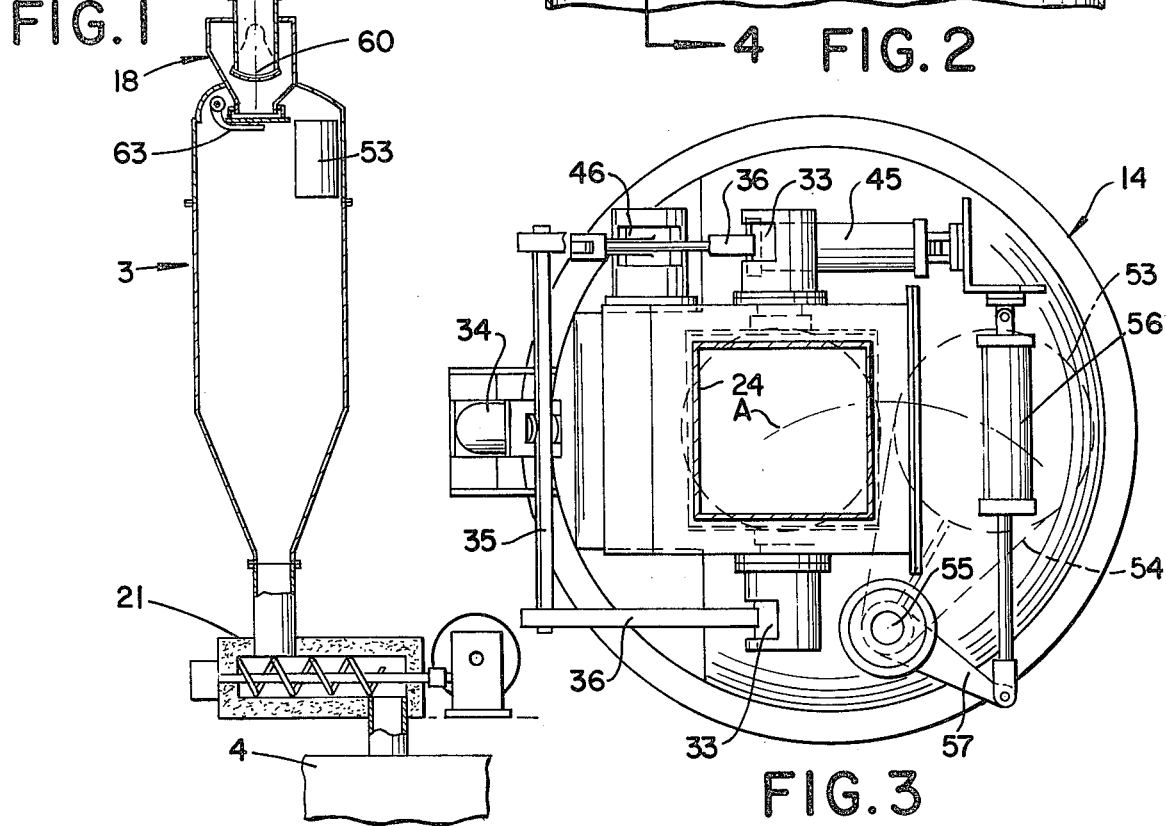
FIG. 1
FIG. 2
FIG. 3

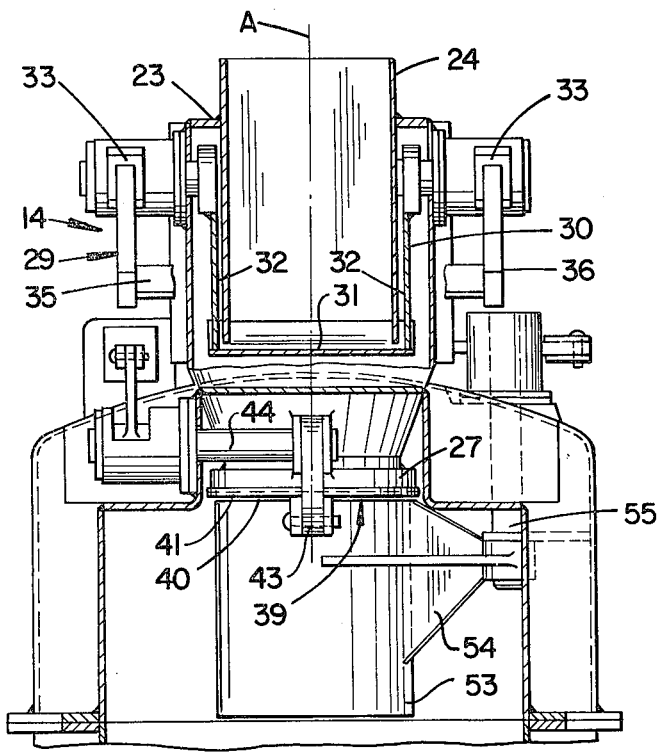
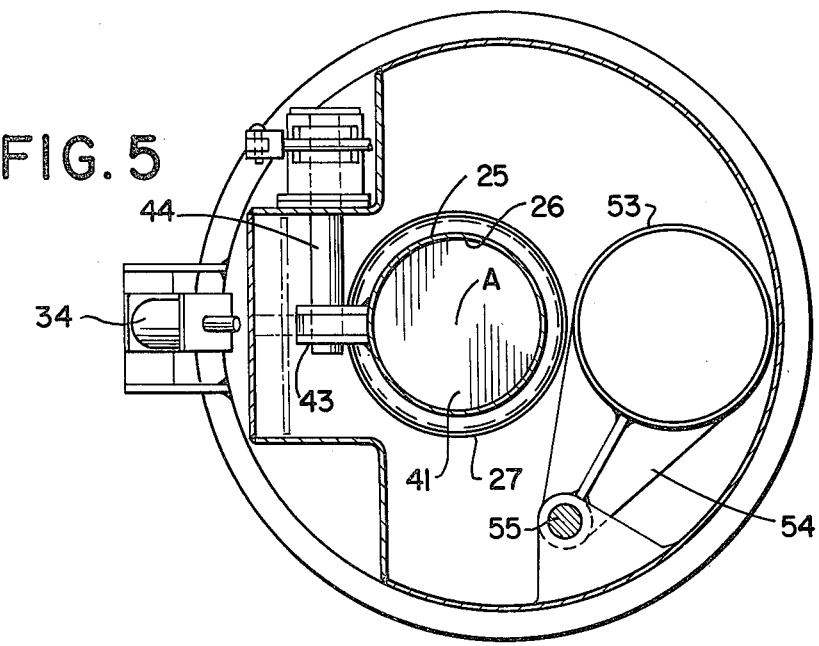
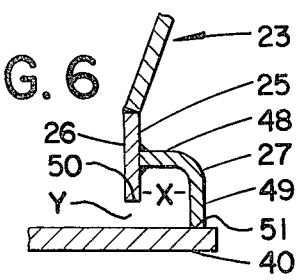
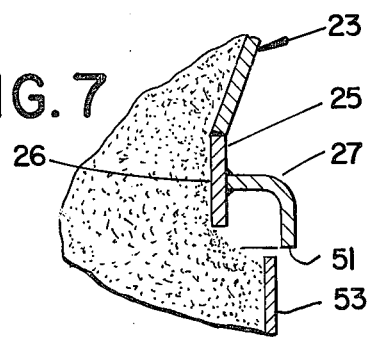

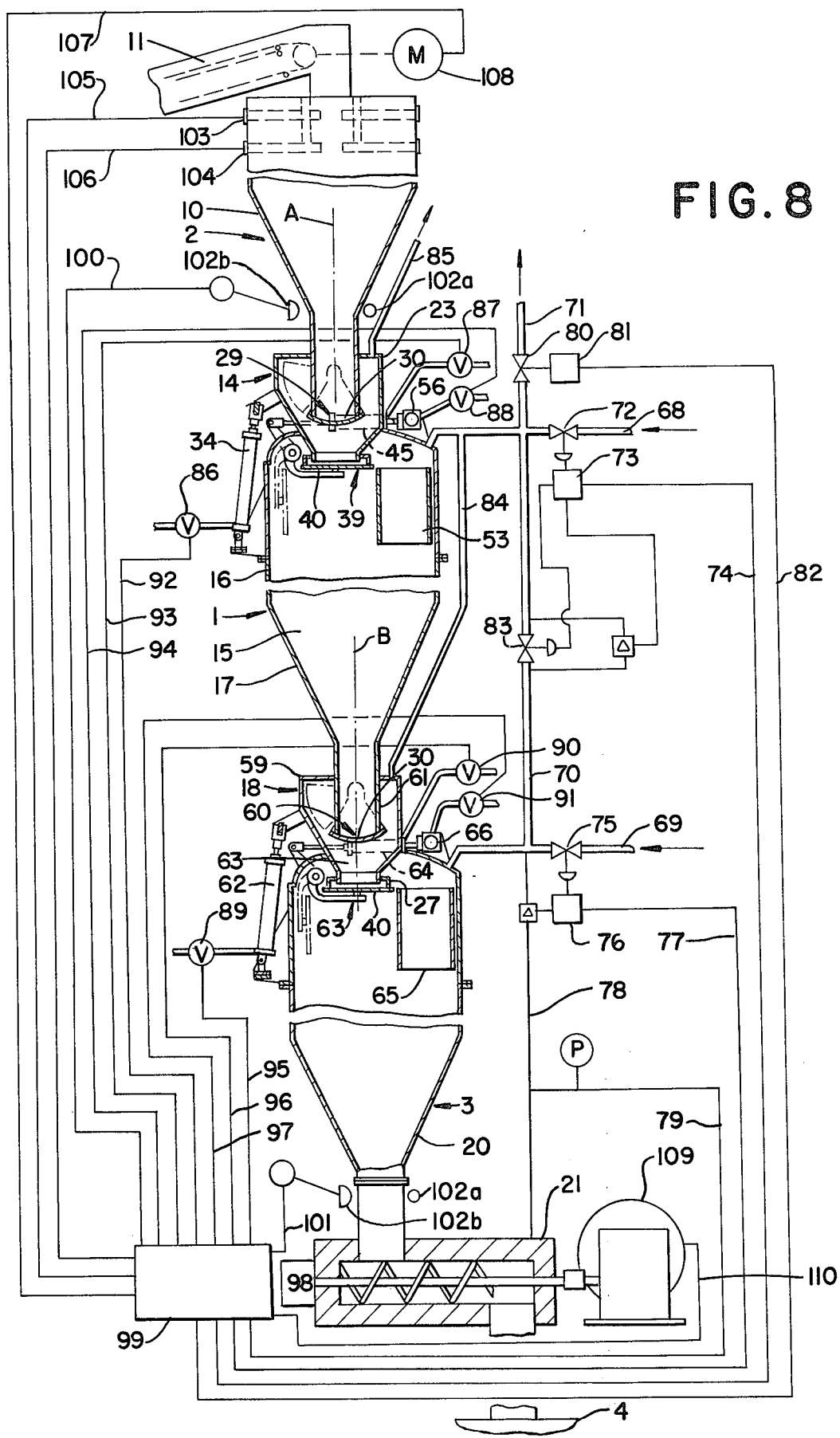

APPARATUS FOR INTRODUCING PARTICULATE MATERIAL INTO A VESSEL

BACKGROUND OF THE INVENTION

This invention relates to apparatus for introducing particulate material into a vessel or chamber that contains gas at a pressure substantially different from atmospheric pressure, and more particularly to such apparatus comprising gas valve means adapted to be moved to open and close at appropriate times to permit flow of particulate material into the vessel while minimizing gas pressure charge from such vessel during the charging operation.

Such a vessel may have an internal gas pressure above or below the pressure of ambient atmospheric air; for convenience such vessel will be referred to hereinafter as a "pressurized" vessel.

Known apparatus often used for charging particulate material into pressurized vessels comprises a gas lock chamber separated from the pressurized vessel by gas valve means at the discharge end of the chamber between the interior of the chamber and the interior of the vessel, and having other gas valve means at the feed end of the chamber between the interior of the chamber and means supplying particulate material, such combination constituting a gas lock.

After the gas valve means at the feed end of the lock chamber is opened and while the gas valve means at the discharge end of the chamber is closed, particulate material is introduced into the chamber; by thereafter causing the gas valve means at the feed end of the lock chamber to be closed and the gas valve means at the discharge end of the lock chamber to be opened, the particulate material is passed from the chamber into the pressurized vessel. Thus, introduction of particulate material into the pressurized vessel can be effected with little if any change of gas pressure in the pressurized vessel particularly if the pressure of gas in the lock chamber is appropriately equalized with that in the vessel after the valve means at the feed end of the lock chamber is closed and before the valve means between the lock chamber and the pressurized vessel is opened.

If, as has often heretofore occurred, the particulate material passing through the gas lock means contacts the sealing surface of the gas valve means as by adhering to such surfaces or otherwise being interposed between them, proper sealing cannot be effected and gas leakage and undesired pressure variations can result.

Moreover, it often happens that particulate material that has been introduced into a lock chamber rises to a level in the chamber where it can impair proper closing movement and sealing of the gas valve means at the feed end of the chamber, so that the gas valve means cannot close and seal sufficiently to prevent undesired passage of gas and changes in gas pressure in the pressurized vessel and elsewhere. Similar problems can occur at the gas valve means at the discharge end of the gas lock chamber.

The possibilities of such problems arising from improper sealing are increased if automatic means are provided to control the operation of the valve means, because such improper closing and sealing of the gas valve means can impair proper automatic operation, particularly at high rates of handling large volumes of particulate material.

However, it is often desired to automatically control operation of apparatus embodying a gas lock chamber for introducing particulate material into a pressurized chamber, as in high volume high rate operations.

SUMMARY OF THE INVENTION

An object of the invention is to solve all, or as many as desired, of the above problems. A further object is to provide in apparatus of the type indicated, means for insuring that the particulate material passed through the gas valve does not contact or become interposed between the sealing surfaces on the stationary seat and closure means of the gas valve means to cause leakage. A further object is to provide in such apparatus means for clearing the space beneath the gas vale and gas lock mechanism of the character discussed above to insure that it is free particulate material that could interfere with the operation of the gas valve. A further object is to provide advantageous gas lock means. Another object is the provision of systems for automatically actuating operation of such apparatus.

The invention comprises, among other things, a valve, such as a gas valve, comprising a conduit through which particulate material passes, the conduit having an opening defined by a wall of the conduit, a valve seat surrounding and laterally spaced from such wall and projecting axially beyond the opening, and a closure member adapted to be moved to an opened position when it opens the opening and to a closed position where it engages the valve seat and closes the opening.

The invention also comprises apparatus for introducing particulate material into a pressurized vessel that comprises a chamber adapted to contain gas, downwardly extending conduit means having an opening that opens into the chamber and is adapted to have the particulate material flow downwardly therethrough into the chamber in a generally free path of flow, material-holding valve means adapted to be located in a closed position in which it extends across the conduit means above the opening to prevent flow of particulate material and which is adapted to be located in an opened position, gas valve means, preferably of the type indicated above, located below the material-holding valve means and having closure means adapted to be located in closed position to form a gas-tight seal at the opening and adapted to be retracted to opened position before the material-holding valve means is opened, the closure means being adapted to move between its opened and closed positions through a space in the chamber below the opening, and clearing means adapted to be moved after the material-holding valve means is closed and while the gas valve means is opened to insure that the space through which the closure means of the gas valve means moves between its opened and closed positions is free of particulate material that could impair formation of a gas-tight seal by such closure means.

The invention also comprises a gas lock chamber having a feed end and a discharge end through each of which particulate material may pass downwardly, and including a similar combination of material holding valve means, gas valve means, and clearing means at each of its feed end and its discharge end.

The invention also provides such apparatus embodying a control system whereby the material holding valve means, the gas sealing valve means, and the clearing means may be automatically operated in a proper predetermined order. According to the invention, such system may be used at both the feed end and discharge end of the gas lock chamber, or at either end only, to control operation of the valve means and the clearing means.

BRIEF DESCRIPTION OF DRAWINGS

These and other objects, features and advantages of the invention will be apparent from the following description of preferred embodiments of the invention in connection with the accompanying drawings in which:

FIG. 1 is a diagrammatic side elevation to a small scale of a preferred embodiment of the invention, comprising a source of particulate material, a gas lock chamber, a load hopper and a pressurized vessel into which the particulate material is discharged;

FIG. 2 is a section showing a portion of the valve means and associated apparatus at the upper portion of the lock chamber of FIG. 1, the section being taken along the same plane as FIG. 1 but to a considerably larger scale;

FIG. 3 is a section along line 3—3 of FIG. 1 to the scale of FIG. 2;

FIG. 4 is a section along line 4—4 of FIG. 2 and to the same scale;

FIG. 5 is a section along line 5—5 of FIG. 2 and to the same scale;

FIG. 6 is a detail, to an enlarged scale, of a portion of the gas valve means of FIGS. 1-5 showing the relationship of the stationary valve seat to the valve opening and to the valve closure member when the gas valve means is closed;

FIG. 7 is a detail, to the same scale, of the same portion of the gas valve means, when opened, showing the relationship of the stationary valve seat and the clearance means;

FIG. 8 is a view similar to that of FIG. 1 but to a larger scale showing a preferred control system;

DESCRIPTION OF PREFERRED EMBODIMENTS

Figure 9:
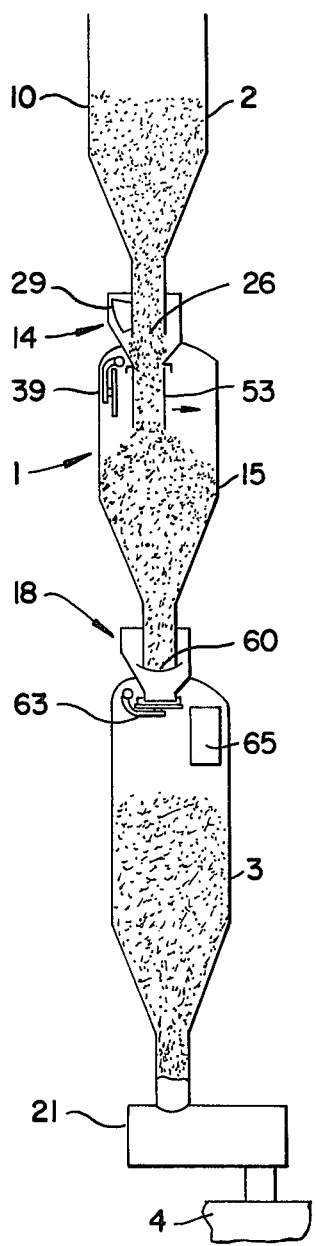
FIGS. 9-15 are views to a smaller scale of the apparatus illustrating a preferred cycle of operations.
Figure 10:
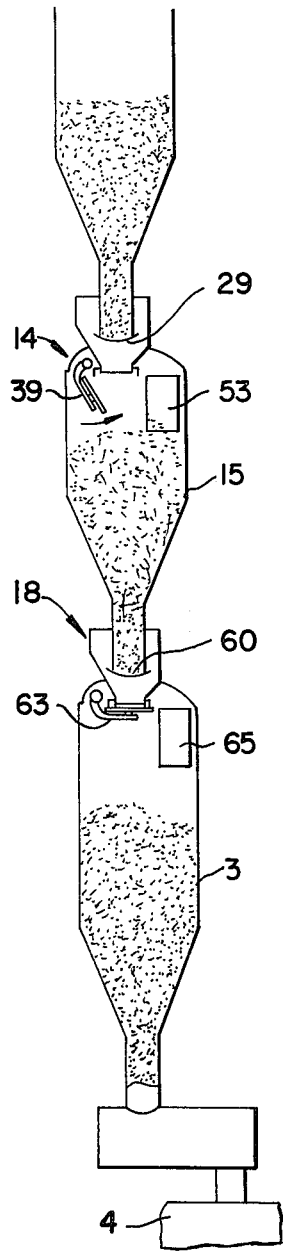
Figure 11:
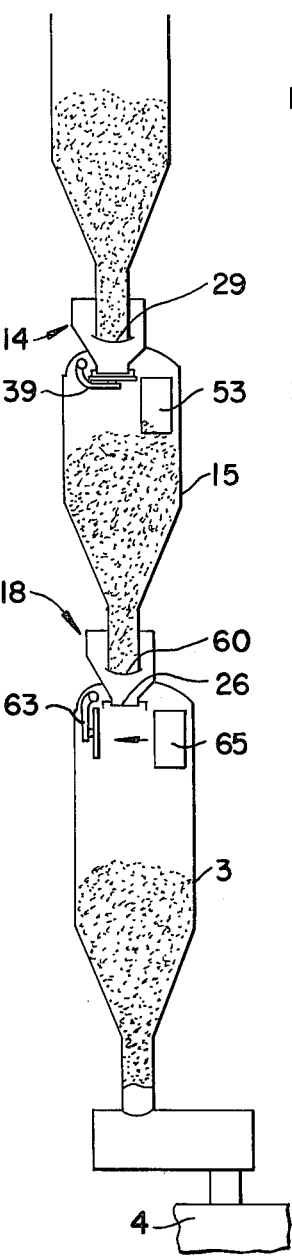
Figure 12:
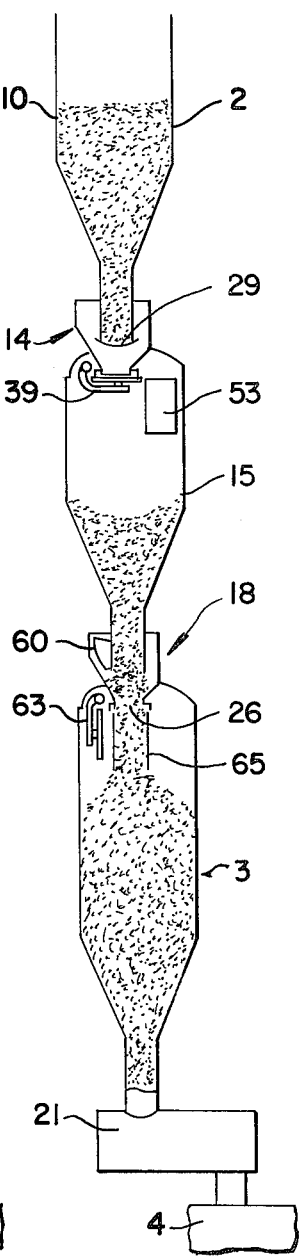
Figure 13:
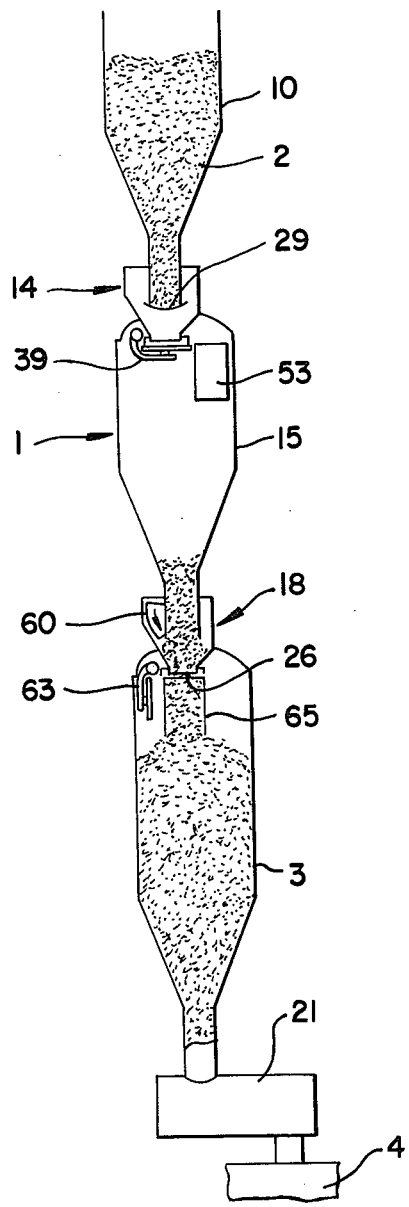
Figure 14:
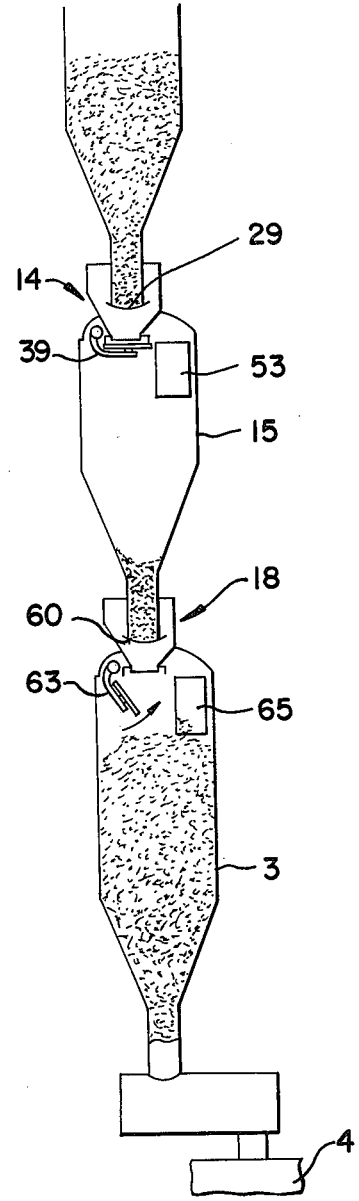
Figure 15:
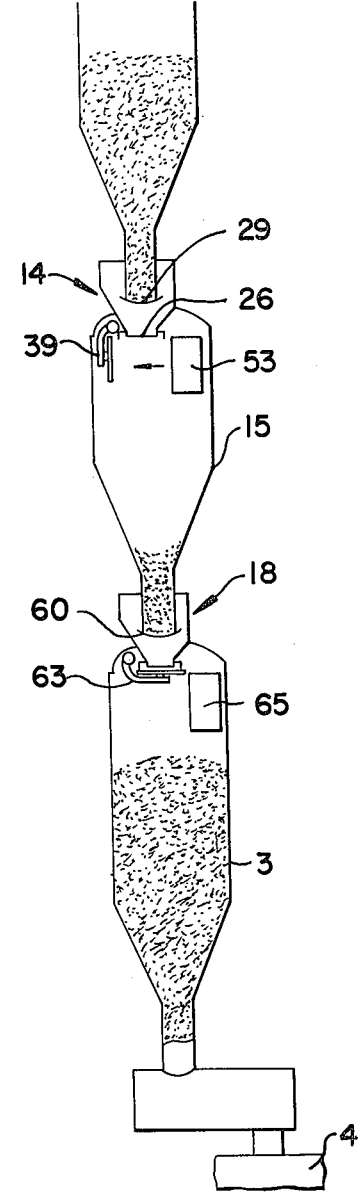

In drawings and the following discussion, the invention for illustrative purposes is disclosed as used in apparatus for gasifying coal, in which particulate coal such as crushed coal is passed from a location in which it is at essentially ambient atmospheric pressure, and introduced in a controlled manner into a vessel having gas pressure substantially above atmospheric pressure, as 1000 pounds per square inch gage. The invention may be used, however, in connection with the introduction of particulate material of other types into other types of pressurized vessels, even those the interiors of which are at pressures substantially below atmospheric pressure.

In the embodiment of FIGS. 1-15 of the drawings, particularly as shown in FIGS. 1-8, gas lock means 1 is disposed between a source of supply 2 and an intermediate pressurized vessel or load hopper 3 that discharges particulate material into a reactor vessel 4 containing gas at a pressure substantially above atmospheric pressure, and forming part of an apparatus for gasifying coal.

More specifically (FIG. 1), in the illustrated apparatus, the source 2 of particulate material, which in this case is finely divided coal, is a surge tank or feed hopper 10, to which the coal is supplied from a suitable known conveyor means 11 that may be adapted to serve several installations such as that illustrated. The lower portion 12 of hopper 10 is tapered, as frusto-conical, to direct the coal downwardly and is connected gas-tight through flexible coupling 13 to valve means 14, to be described later.

Valve means 14 is at the top or feed end of a gas lock chamber 15, which has an enlarged, preferably generally cylindrical upper portion 16 and a lower tapered, preferably frustoconical, portion 17 terminating in another valve means 18 to be described later. Valve means 18 is located at the bottom or discharge end of the chamber 15 and at the upper feed end of vessel 3, which has an enlarged, preferably cylindrical upper portion 19 and a lower tapered, preferably frustoconical, portion 20 discharging into pressurized reactor vessel 4 having a high gas pressure, through a known feeder such as power driven screw feeder 21 sealed to contain gas. Chamber 15 and valve means 14 and 18 comprise gas lock means 1. Substantial superatmospheric gas pressure is maintained in reactor vessel 4, screw feeder 21 and vessel 3 in operation of the apparatus.

Valve means 14 (FIGS. 1, 2-8) comprises a housing 23 embodying a downspout portion 24 that extends into and terminates in housing 23. Portion 24 is shown square in cross section, but could be of circular or other cross section. Housing 23 has a lower convergent wall portion 25 that extends into and is connected gas-tight to the upper portion of chamber 15. Portion 25 has a circular bottom opening 26 having a cross sectional area similar to that of the interior of downspout portion 24, and a surrounding valve seat portion 27.

Downspout portion 24 and portion 25 thus define a conduit between the interiors of hopper 10 and chamber 15 that causes particulate material to flow freely downwardly in a path having central axis A, from hopper 10 into chamber 15, when valve means 14 is completely open.

Valve means 14 also includes a material-holding valve means 29 comprising a movable gate member 30 including a closure portion 31, constituting a segment of a cylindrical wall, fixed to upwardly extending end members 32 that are located inside housing 23 and outside of downspout portion 24, and that are fixed to stub shafts 33 pivotally mounted gas-tight in the housing 23, to permit closure portion 31 to be positioned at the bottom of downspout portion 24 to close its bottom opening as shown in FIGS. 1, 2, 4, 8 and to open the bottom of portion 24 when closure portion 31 is swung to one side as shown in broken lines in most of such figures. The bottom of downspout portion 24 is curved to closely fit the clyindrical shape of closure portion 31 when it is closed, thus to prevent escape of material. Preferably, a clearance C (FIG. 2) is provided between portions 24 and 31 adequate to make possible free movement of portion 31 without jamming, but small enough to prevent escape of particles of particulate material; a clearance of about 1/32 inches (0.8 mm.) or about ⅛ to 1 inch (3.18 mm. to 2.5 cm.) for large particles.

Gate member 30 is thus moved between its closed and opened positions by a fluid powered operating cylinder 34 (FIGS. 2, 3, 8) pivotally mounted on chamber 15 and having its piston rod connected to a cross member 35 that is pivotally connected at its ends to arms 36 on shafts 33.

Valve means 14 also includes gas valve means 39 comprising a movable closure member 40 including a closure portion 41 pivotally connected for movement limited by set screw 42, to an offset arm 43 rigidly mounted on a shaft 44 rotatably mounted in the upper portion of chamber 15 and extending through the wall of the chamber in gas tight relation. Arm 43 and closure portion 41 are so designed that the valve means can be closed by swinging member 40 about the axis of shaft 44 so its closure portion seats in gas sealing relation against the valve seat portion 27 around opening 26 in the bottom of housing 23 to close chamber 15 against escape of gas through valve means 14, and opened by swinging member 40 downwardly and to one side (FIGS. 2,5) so that closure portion 41 and arm 43 clear any particulate material falling in its path of flow through opening 26. Member 40 is thus moved between its opened and closed positions by a fluid powered operating cylinder 45 (FIGS. 2, 3) pivotally mounted on the exterior of chamber 15 and having its piston rod connected to an arm 46 rigidly fixed on a projecting end of shaft 44.

When both material-holding valve means 29 and the gas valve means 39 are opened, particulate material can therefore pass freely from hopper 10 into chamber 15 in a path of flow along axis A, until valve means 29 is closed, at which time the flow of material ceases.

Valve seat portion 27 (FIGS. 2, 5, 6) comprises a generally radial portion 48 that is fixed gas-tight to wall portion 25 at a location substantially away from opening 26, and a generally axial portion 49 that is spaced radially outwardly a substantial distance X from the edge 50 of wall portion 25 defining opening 26 and has a seating and sealing edge or portion 51 spaced a substantial distance Y axially outwardly away from the edge 50 of wall portion 25 defining opening 26.

The sealing edge 51 of valve seat portion 27 and the sealing surface of the closure member 40 mate when the closure member is in closed position, both being shaped in the illustrated embodiment to lie in the same plane. Mating is facilitated because the pivotal connection of member 40 to arm 43 allows the closure member to adjust to the sealing edge 51 as required.

Moreover, the fact that the edge 51 is located radially outwardly a substantial distance and axially downstream a shorter distance from the edge 50 of opening 26, means that particulate material flowing through opening 26 is sufficiently distant from seating and sealing and sealing edge 51 to insure that no such material is deposited on edge 51 that can impair the sealing effectiveness of the valve when closed. More particularly, distance X is sufficient to prevent deposition of particulate material on sealing edge 51 from material flowing through opening 26 or from material deposited in chamber 15 after it has left the opening; distance Y is sufficient to insure that any particulate material flowing through opening 26 that may adhere to edge 50 does not contact the closure member 40 when it is in closed position to prevent tight closing of and complete gas sealing by member 40.

In general, it is desired to fill chamber 15 to as great an extent as possible without having the particulate material extend into housing 23. However, to make certain that the particulate material does not contact the closure member 40 of gas valve means 39 at any time while the material is flowing or after flow has stopped, and also to insure that the upper portion of the body of material in chamber 15 does not impede movement of the closure member 40 or prevent it from seating gas tightly against its seat portion 27, means are provided to insure that the space below the gas valve means is cleared and kept clear of particulate material that could cause such problems.

The means illustrated in FIGS. 1-5, 7 for this purpose comprises a sleeve 53 in chamber 15, having a cross section approximating in shape the cross sections of opening 26 and valve seat portion 27 but substantially larger than that of opening 26 and slightly smaller than the inner portion valve seat so that as shown in FIG. 7 particulate material that is in sleeve 53, immediately after the material holding valve is closed and flow of the material stopped, will assume an angle of repose such that it completely clears and is spaced from gas sealing edge seat 51. This sleeve (FIGS. 3, 4, 5) is rigidly connected to an arm 54 fixed to shaft 55 that is pivotally mounted in chamber 15 about a vertical axis so the sleeve can be bodily moved to a position where it is immediately beneath and aligned with the opening 26 in the bottom of housing 23 through which the particulate material discharges, as shown in broken lines in FIGS. 2, 5, so the sleeve thus forms an extension of the conduit formed by downspout portion 24 and the lower wall portion 25, and also can be bodily moved to a position laterally offset and away from the path of flow of the particulate material, as shown in full and dotted lines in FIGS. 2, 3, 5. The sleeve is so moved between these two positions by fluid powered operating cylinder 56 (FIG. 3) pivotally connected to the upper exterior portion of chamber 15 and having its piston rod connected to an arm 57 fixed to end of shaft 55 that projects in gas tight relation from chamber 15.

Valve means 18 at the lower or discharge end of chamber 15 is identical to valve means 14 at the upper or feed end. Valve means 18 comprises a housing 59 (FIG. 8) connected gas-tight to the lower conical portion of chamber 15, and containing material-holding valve means 60 identical with material-holding valve means 29 of valve means 14 and having parts identical to those of FIGS. 2-7. Valve means 60 includes a movable closure gate member 30 adapted to open and close the opening in the bottom of a downspout portion 61 in housing 59. Gate member 30 is so moved as required by a fluid powered operating cylinder 62 as in valve means 14.

Valve means 18 also includes gas valve means 63 identical with gas valve means 39 previously described and having parts identical to those of FIGS. 2-7. Gas valve means 63 comprising closure member 40 adapted to seat against seat portion 27 and movable between an opened position and a closed position by a fluid powered operating cylinder 64. When closed, valve means 63 effectively seals against escape of gas from vessel 3 even though chamber 15 may be at a substantially lower gas pressure; and when both valve means 60 and 63 are opened, closure member 40 of valve means 63 is clear of the path of flow of particulate material flowing through the conduit defined by downspout portion 61 and the lower portion of housing to which path of flow has an axis B.

A laterally bodily movable sleeve 65 performs for gas valve means 63 the same function as sleeve 53 performs for valve means 39. Sleeve 65 is related in cross sectional size and shape to valve seat portion 27 of gas valve means 63 as previously described sleeve 53 is related to valve seat portion 27 of valve means 39, and is moved by fluid powered operating cylinder 66 as required to move sleeve 65 to a position in which it is aligned with the opening in the bottom of housing 59 and the path of flow of material through such opening, and also to a position in which the sleeve is bodily located laterally away from said opening and the path of flow as shown in FIGS. 1, 8.

The apparatus of FIGS. 1-8 includes means for adjusting the gas pressures in chamber 15 to that of vessel 3 when material is to be passed from chamber 15 into vessel 3. Gas pressures in vessel 3 in this illustrative embodiment are substantially above atmospheric pressure; in chamber 15 they are at times at such superatmospheric pressures and at other times at atmospheric pressure. Such means for adjusting the gas pressures includes conduit means 68 and 69 (FIG. 8) which are connected to a suitable souce of pressurizing gas, such as air, steam or nitrogen, depending on the type of particulate material being handled. Conduits 68 and 69 are connected by conduit 70 which is connected to vent conduit 71. Conduit 68 connected to chamber 15 has upstream of conduits 70, 71 a known valve 72 adapted to be opened and closed by control unit 73 actuated from an electrical signal supplied through circuit means 74. Conduit 69 connected to vessel 3 has upstream of conduit 70 a known valve 75 adapted to be opened and closed by control unit 76 actuated from electrical signal supplied through circuit means 77. Conduit 78 is connected to conduit 69 downstream of valve 75 and to the interior of feeder 21. Conduit 78 may have means 79 such as a pressure gauge to indicate the feeder and reactor gas pressure or provide an alarm signal indicating excessive pressure.

Vent conduit 71 has a known valve 80 adapted to be opened and closed by control unit 81 actuated from an electrical signal supplied through circuit means 82. This valve is used to equalize the pressure in chamber 15 with that of the ambient atmosphere just prior to opening of gas valve means 39 and material holding valve means 29. Gas at superatmospheric pressure in chamber 15 can be vented to the atmosphere or to the intake of the pressurizing source connected to conduits 68 and 69.

Conduit 70 has a known valve 83 adapted to be opened and closed as required by control unit 73. Valve 83 is an equalizing valve during normal operation. It is closed when the pressure of gas in chamber 15 is equalized with atmospheric pressure. It is opened when chamber 15 is being pressurized and the pressure rises in such chamber to nearly equal the pressure in vessel 3. During shut-down of the apparatus, valve 83 is also used to vent vessel 3 in cooperation with valve 80.

A vent conduit 84 communicates with the interior of the upper portion of chamber 15 and with the interior of housing 59 at the upper portion of vessel 3, to insure that the pressure in these two interiors is at all times equal, even when the gas valve means is closed and the pressure in chamber 15 is reduced to atmospheric pressure. The purpose of this conduit is to prevent undesirable pressure differences from occurring from the presence of particulate material in downspout portion 61 of lower housing 59 that could impair equalization of gas pressure between the interiors of chamber 15 and housing 59.

Similarly, upper housing 23 has a vent conduit 85 communicating directly with the atmosphere to insure that the housing is at all tiimes at atmospheric pressure even though there should be particulate material in downspout portion 24 that might impair equalization of gas pressure between the interior of housing 23 and indirectly to the atmosphere through hopper 10.

This gas supply and control system therefore, makes it possible to insure that the high gas pressure in vessel 3 is at all times equivalent to the gas pressure in the feeder 21 and hence in reactor vessel 4; that the pressure in lock chamber 15 can be equalized with atmospheric pressure when the material-holding valve means 60 and gas valve means 63 at the bottom of the chamber are closed and the material-holding valve means 29 and gas valve means 39 at the top of the chamber are open to permit material to discharge into the chamber; and that the pressure in chamber 15 can be equalized with the pressure in vessel 3 as required to permit particulate material to pass from chamber 15 into vessel 3 after the material-holding valve means 29 and gas valve means 39 at the top of chamber 15 are closed and the material-holding valve means 60 and gas valve means 63 at the lower end of the lock chamber 15 are open.

The gas control system so far described therefore embodies means for providing proper gas pressures in chamber 15 and vessel 3 at the proper times by appropriate electrical control signals, and safety features to prevent excess gas pressures that could cause damage or danger.

This embodiment also includes means for controlling the operation, by means of electrical control signals, of the material holding valve means and gas valve means of the valve means 14 and 18 at the upper and lower ends of lock chamber 15; remotely controlled known actuating means 86-91 inclusive, such as solenoid valve means, for respectively controlling operation of the fluid cylinders 34, 45 and 56 of material-holding and gas valve means 29 and 39 and clearance sleeve 53 at the top of lock chamber 15, and of fluid cylinders 62, 64 and 66 of material-holding and gas valve means 60, 63 and clearance sleeve 65 at the bottom of chamber 15, are actuated by appropriate electrical signals supplied respectively by electrical circuit means 92 to 97 inclusive.

This embodiment also includes means for automatically providing appropriate electrical control signals for controlling operation of the gas valves 72, 75, 81 and 83, and of the fluid powered cylinders 34, 45, 56, 62, 64 and 66. Such automatic control means in this embodiment embodies a "count down" means controlled by operation of the feeder 21. Such cound down means comprises a known type of pulser or count down unit 98 connected to the shaft of the screw means of feeder 21 that, after a predetermined number of revolutions of the shaft, provides electrical signals that cause a known sequence control unit 99 to start a sequence of sending electrical signals through the above described circuit means 74, 77, 82 and 92-97 to control the gas valve actuating means and the hydraulic cylinders causing operation of the material-holding valve means, gas valve means, and clearance sleeves. By such means the apparatus can be operated to cause particulate material to be discharged from feed hopper 10 through lock chamber 15 into vessel 3 at times and in quantities such that the material can be automatically continuously fed into the reactor vessel 4 by feeder 21, at a predetermined rate.

The apparatus also includes an alarm means that detects if particulate material in feed hopper 10 is dangerously low and signals an alarm through circuit means 100 to control unit 99, and an alarm means that similarly detects if particulate material in the vessel 3 is dangerously low and signals an alarm through circuit means 101 to control unit 99.

Each of such alarm means may be suitable known means of any suitable type, such as the "Secoal Nuclear Coal Monitor," manufactured by Stock Equipment Co., comprising a source unit 102a containing a source of radioactive radiation such as radium, that continuously emanates radiation directly in a generally lateral path across the flow path of particulate material toward a detector unit 102b such as a Gieger-Mueller tube on the opposite side of the flow path, that is connected to the control unit 99 as indicated; such alarm means can also provide a visual or audible alarm signal by known means S, if desired.

The necessary quantity of particulate material in the feed or surge hopper 10 is preferably automatically suitably continuously maintained by known suitable means controlling delivery of material by conveyor 11. Such means (FIG. 8) may include known high and low lever sensing means 103 and 104 connected through circuit means 105 and 106 to control unit 99, which is connected through circuit means 107 to control operation of known power source 108 that drives conveyor 11, thus controlling the rate of discharge of particulate material by the conveyor. Such sensing means may be like that discussed above in connection with the alarm means.

Preferably, operation of the power source 109 for the feeder 21 is controlled through circuit means 110 by sequence control unit 99.

A preferred method of operation of the apparatus described above may be understood by reference to FIGS. 9 to 15 inclusive.

The feeder 21 is actuated to start rotation; after a predetermined number of rotations, count down unit 98 signals the sequence control unit 99 to activate it so that unit 99 receives signals from various elements such as the level sensing means and pressure device described above, and sends appropriate signals to control other elements such as the power sources, the gas valves, and the hydraulic cylinders through the circuit means described above.

In normal operation of the apparatus, during most of the time both the material holding valve means 29 and the gas valve means 39 of the upper valve means 14 are closed and the material holding valve means 60 and the gas valve means 63 of the lower valve means 18 are opened, the feed hopper 10 is substantially full of particulate material and the gas lock chamber 15 is partially full, and particulate material is being continuously removed from the vessel 3 by screw feeder 21 discharging into reactor vessel 4.

However, for convenience, the illustrative cycle will begin with the conditions illustrated in FIG. 9 in which particulate material is being fed from the vessel 3 into the feeder 21 and into reactor vessel 4, the vessel 3 being sealed from lock chamber 15 because gas valve means 63 and material-holding valve means 60 at the lower end of chamber 15 and the upper end of vessel 3 are closed, clearance sleeve 65 being retracted to its side position; gas valve means 39 and material-holding valve means 29 at the upper end of lock chamber 15 are opened; and the clearance sleeve 53 is aligned with the discharge opening 26 of the gas valve means. The gas pressure in lock chamber 15 is at atmospheric pressure, while that in vessel 3 is at the super-atmospheric pressure of the feeder 21 and reactor vessel 4. Charge material is passing from feed hopper 10 into the lock chamber 15.

Thereafter (FIG. 10), material-holding valve means 29 is closed to cut off the flow of material into chamber 15, and clearance sleeve 53 is moved to its side position to clear away particulate material from the space through which the closure means of gas valve means 39 must swing to close. The conditions in vessel 3 are unchanged from those of FIG. 9.

Thereafter (FIG. 11), the closure means of the gas valve means 39 is closed completely to seal chamber 15 gas-tight from the atmosphere, and pressurizing gas is introduced into chamber 15 to bring its pressure to that of vessel 3. Thereafter, gas valve means 63 at the lower end of lock chamber 15 is opened after which the clearance sleeve 65 is moved laterally into a position where it is aligned with the discharge opening 26 of gas valve means 63. The material holding valve means 29 and gas valve means 39 at the top of lock chamber 15 are completely closed and sleeve 53 is in its side position.

In the next stage (FIG. 12), gas valve means 63 being opened, the clearance sleeve is aligned with opening 26 of valve means 63, and then the material-holding valve means 60 is next opened to permit particulate material to discharge from lock chamber 15 into vessel 3, both of them, of course, being at the same superatmospheric gas pressure.

This operation is continued (FIG. 13) until lock chamber 15 is largely emptied, although the downspout portion 61, valve means 18 and sleeve 65 are filled with the particulate material.

Thereafter (FIG. 14), material-holding valve means 63 of the lower valve means 18 is closed, the clearance sleeve 65 is moved bodily to its side position to clear the space through which the closure member of the lower gas valve means 63 must swing to close, and the member of gas valve means 63 starts to close.

Thereafter (FIG. 15), closure member of the lower gas valve means 63 is completely closed to seal the pressurized vessel 3 from lock chamber 15, the gas pressure in lock chamber 15 is then reduced to atmospheric pressure, and the closure member of the upper gas valve means 39 is opened completely after which clearance sleeve 53 for the upper gas valve means 39 begins to move toward the position where it is aligned with opening 26 of gas valve means 39 and the conduit means of valve means 14.

After this, the material holding valve means 29 of the upper valve means 14 is opened to allow particulate material to discharge from feed hopper 10 into the lock chamber 15 for a predetermined period, until the conditions set forth in connection with FIG. 9 are re-established. The cycle is then uninterruptedly repeated as often as desired, as long as particulate material is supplied to feed hopper 10, the recycle time being a function of the feed rate into reactor vessel 4 of the capacity of vessel 3.

Meanwhile, feeder 21 continuously withdraws particulate material from the lower vessel 3 and passes it into the reactor vessel 4, all of the operations being carried out in proper timed relation to achieve the results of properly periodically pressurizing and exhausting gas from the lock chamber 15, moving sleeves 53 and 65 opening the valve means 39, 29, 63 and 60, and charging materials into the chamber 15 and from there to the lower vessel 3, in order to make possible continuous feeding of particulate material through feeder 21 into the reactor vessel 4.

The sequence control unit 99 may be programmable, and may be programmed or otherwise set, not only to perform the above described operations, but also for starting up and for shutting down the apparatus and also for handling upset or unusual conditions.

The illustrative apparatus of FIGS. 1-8 was designed for a feed rate of 90 tons of crushed coal per hour through the lock chamber, the capacity of lock chamber 15 being approximately 7 tons and that of the vessel 3 being approximately 11 tons of coal, the time required for one cycle as described above being approximately 5 minutes. Of course, lock chambers and vessels of other capacities, and other time cycles may be used.

Figures 16, 17:
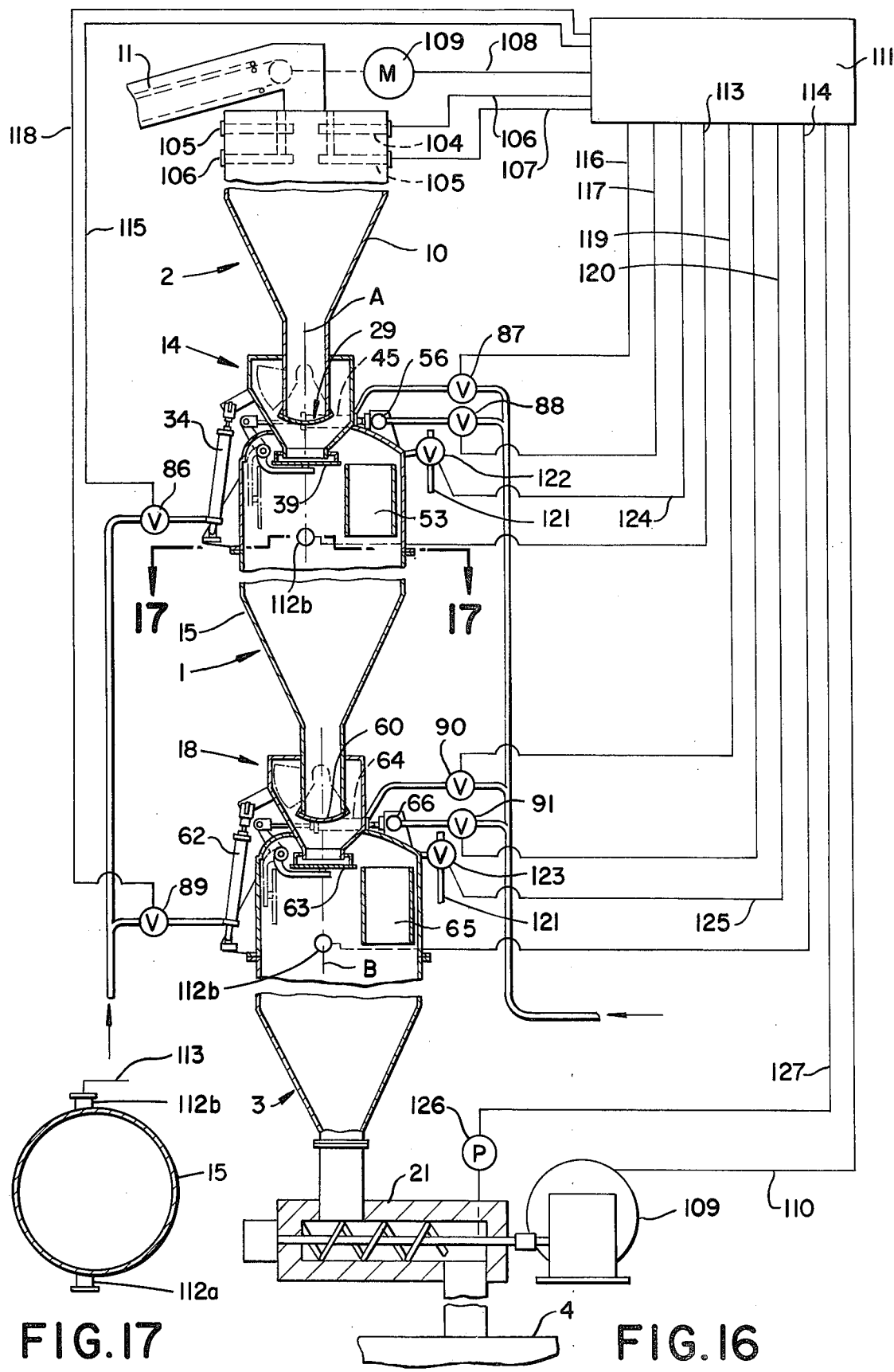
FIG. 16 is a section of an apparatus similar to that of FIGS. 1-8 but showing a different type of control system.
FIG. 17 is a section along line 17—17 of FIG. 16.

FIGS. 16, 17 illustrate another system for automatic control of the operation, and parts identical with parts of the previous embodiment have the same reference characters.

In this apparatus, the cycle is not controlled by "countdown", but by suitable known programmable control means 111. The apparatus includes means for detecting the presence of particulate material in chamber 15, at a predetermined level, after the chamber has been substantially filled. Such means may be that described above such as the Secoal Nuclear Coal Monitor, comprising a source unit 112a containing a source of radioactive radiation and a radiation detector unit 112b on the opposite side of the flow path of particulate material preferably so the radiation can intersect axis A of the path. A similar means for detecting the presence of particulate material is located in the lower portion of vessel 3, comprising a similar source unit 112a of radiation and a similar radiation detector unit 112b located so that the path of radiation from the source unit can intersect the axis B of the flow path of material discharging into vessel 3.

The detector units 112b the remotely controlled known actuating means 86 to 91 such as solenoid valve means for respectively controlling operation of fluid cylinders 34, 45 and 56, material-holding and gas valve means 29 and 39 and clearance sleeve 53 at the top of lock chamber 15, and of fluid cylinders 62, 64 and 66 of material-holding and gas valve means 60, 63 and clearance sleeve 65 at the bottom of chamber 15, are respectively connected through suitable known electrical circuit means 113-120 to the control means 111 that controls the portions of the apparatus that performs the functions described above.

In this embodiment, moreover, pressurized gas is supplied as required to each of chamber 15 and vessel 3 from a suitable source 121 through electrically actuated control valves 122, 123 of known type, which are controlled from control means 110 through circuit means 124 and 125. Valves 122, 123 are of the type that can also exhaust gas from the chambers to which they are connected. If desired, as shown in FIG. 16, a known pressure sensitive signaling device 126 may also be included to provide an electrical signal through circuit means 127 to control means 110 to equalize the pressure as required between feeder 21 and the interior of vessel 3 and also to provide safety features.

In normal operation of the apparatus of FIGS. 16, 17 during most of the time both the material holding valve means and gas valve means of the upper valve mens 14 are closed and the material-holding valve means and the gas valve means of the lower valve means are opened, the vessel 3 is full of particulate material and the lock chamber 15 is partially full, and particulate material is being continuously removed from vessel 3 by screw feeder 21 and discharged into reactor vessel 4.

When all of the particulate material, such as coal, has fed out of the lock chamber 15 and the level of particulate material is down to an elevation where the material no longer blocks the radiation from source unit 112a at the top of vessel 3 from impinging on detector unit 112b several operations thereafter occur in sequence. The material-holding valve means 60 at the bottom of lock chamber 15 closes to prevent further discharge of particulate material. Next, the movable sleeve 6t is swung to one side out of the way of the closure member of gas valve means 63 after which this closure member is swung to close tightly and provide a seal between lock chamber 15 and vessel 3 that prevents escape of gases. The pressurized gas in the lock chamber is then exhausted by valve 122 until the internal pressure in the chamber equals atmospheric pressure.

Next, the closure member of gas valve means 39 at the upper end of lock chamber 15 is opened, and movable sleeve 53 is swung into position beneath the bottom opening 26 in housing 23, after which the closure member of the material-holding valve means 29 is opened. This allows particulate material to drop from hopper 10 into the lock chamber 15, completely filling it in a short time. The detector unit 112b at the top of the lock chamber signals to the system that the chamber 15 is filled to its level because the radiation from the source unit 112a is blocked from the detector unit. This signal causes the material holding valve means 29 to close. At this time, the level of particulate material is such that the material extends into the space through which the closure portion of the gas valve means 39 would move as it closes. The sleeve 53 is then swung laterally, carrying with it the column of particulate material in the sleeve and thus provides clearance for the swingable gas valve closure portion to close, after which it closes. Since the sleeve 53 confines the flowing material in the upper part of chamber 15 to the interior of the sleeve, adequate clear space is provided laterally of the path of flow of the material to receive the sleeve 53.

At this stage in the cycle, the hopper 10 is partially full with particulate material, and the lock chamber 15 is completely full. The lock chamber is now ready to be again pressurized with gas at superatmospheric pressure. Valve 122 is actuated to allow pressurized gas to enter chamber 15 to cause the pressure in the chamber to equal that of vessel 3. Lower gas valve means 63 is then opened and the sleeve 65 is moved into position beneath the bottom opening in the valve housing; after which material-holding valve means 60 is opened. Particulate material now drops from lock chamber 15 to completely fill vessel 3 and leave the lock chamber partially filled, the capacities of the load hopper and lock chamber being suitably related for this purpose. This completes the cycle. The cycle may be repeated continuously.

The necessary quantity of particulate material in the surge hopper 10 is automatically suitably continuously maintained by known suitable means such as that of the previous embodiment, for controlling delivery of particulate material by conveyor 11, from control means 111.

Operation of the power source 109 for feeder 21 is controlled through circuit means 110 from control means 111.

This apparatus, under control of means 111 therefore can operate to continuously discharge particulate material through feeder 21 into vessel 4, so long as material is supplied to feed hopper 10 the lock chamber 15 and the valve means 14 and 18 and clearance sleeves 53 and 65 being operated in proper sequence to accomplish this result.

Figure 18:
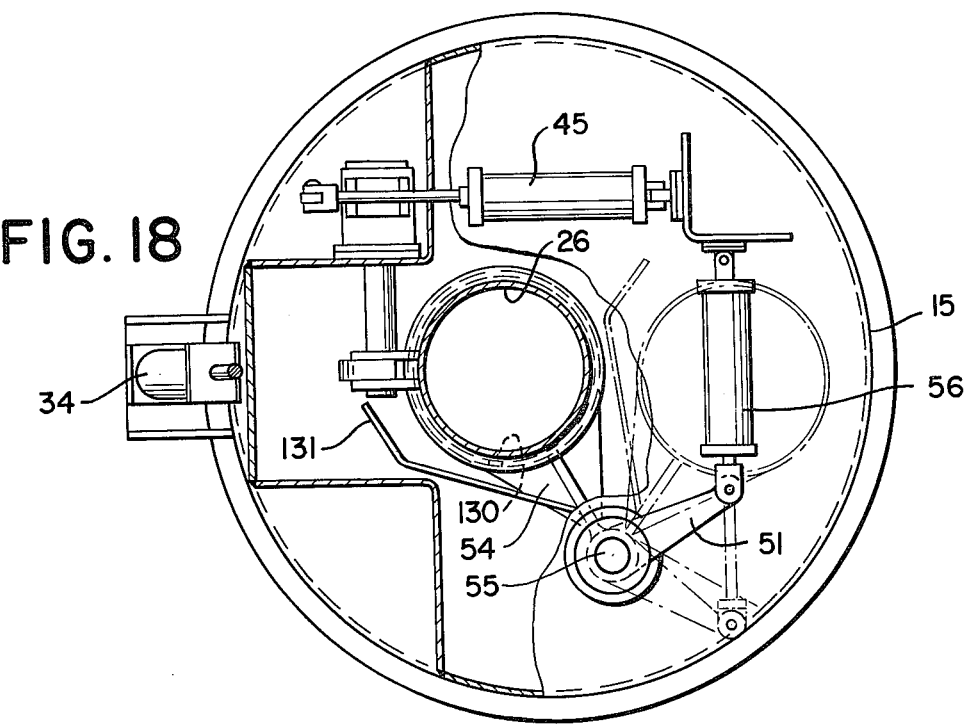
FIG. 18 is a section similar to that of FIG. 5 but embodying a different type of valve clearance means embodying a vane.

Other types of means for clearing away particulate material that would interfere with operation of the closure portions of the gas valve means may be used. That shown in FIG. 18 is similar to that of FIGS. 1–8, except that in the apparatus of FIG. 18 the bodily movable sleeve 130 also rigidly carries a laterally extending upright vane 131 fixed to arm 54 that carries the sleeve. Sleeve 130 is otherwise the same as the sleeve described above, and is moved in a similar means. Vane 131 aids in clearing away any particulate material that may have escaped sleeve 130.

Figure 19:
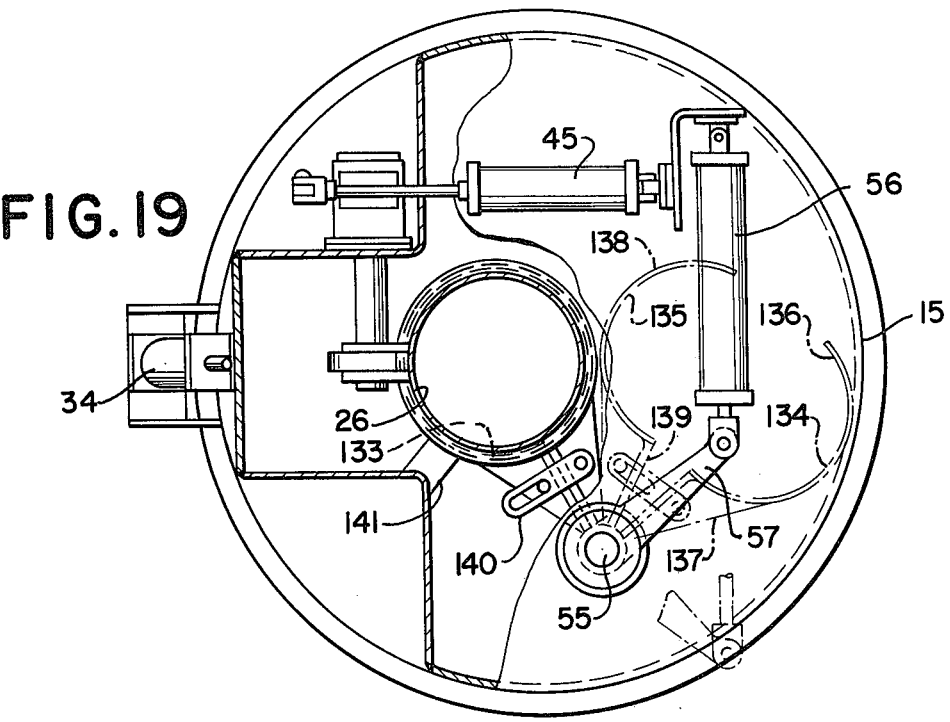
FIG. 19 is another section similar to that of FIG. 5 but embodying a different type of valve clearance means made up of a plurality of parts that can combine to form a sleeve.

Another type of sleeve 133 is shown in the embodiment of FIG. 19. It comprises two parts 134 and 135, which when in a position for discharging particulate material, are closed to form a generally cylindrical sleeve portion as shown in dotted lines in FIG. 19 and which when moved laterally are separated as shown in broken lines in that figure. In this apparatus, sleeve part 134 comprises a semi-cylindrical portion 136, carried by arm 137 in chamber 15 and mounted on rotatable vertical shaft 55 and moved by external arm 57 and fluid power cylinder 56 to a material-discharging position shown in dotted lines in FIG. 19, and a material-clearing position shown in broken lines in that figure. The other part 135 also has a mating semi-cylindrical portion 138 carried by an internal arm 139 rotatably mounted on shaft 55 and connected to arm 137 of part 134 by a flexible link member 140 to cause part 135 to be pulled by part 134 away from the material-discharge position to clearance position. Part 135 is moved back to the discharge position by contact with part 134 and is halted in a proper position to form the complete sleeve 133 contact with fixed stop 141 inside the chamber 15.

Such sleeve made up of a plurality of parts that separate when the sleeve is moved to its side position provide advantages in facilitating sweeping or clearing away particulate material that would interfere with closing of the gas valve, while also providing the advantages of a complete sleeve in aiding discharge of particulate material and protecting the seat of the gas valve from deposit of particulate material that could impair sealing.

Sleeves of the kinds discussed in connection with FIGS. 18 and 19 may be used in both the lock chamber 15 and vessel 3 of the previously discussed embodiments.

While for illustrative purposes the above embodiments have been described in connection with the discharge of particulate material into a pressurized vessel 3 from which it passes to reactor vessel 4, it is apparent that the material could be discharged directly into a reactor vessel without passing through an intermediate vessel 3.

Moreover, while the above disclosure for illustrative purposes involves the discharge of particulate material into a pressurized vessel at which the pressure is substantially above atmospheric pressure, it is apparent that the above or similar apparatus, with modifications apparent to those skilled in the art can be made and operated to discharge particulate material from a location at which it is exposed to a higher pressure such as atmospheric pressure into a vessel which has a lower internal pressure such as one substantially below atmospheric pressure, which may be desirable in certain reactive processes.

Various modifications apparent to those skilled in the art, in addition to those indicated above, may be made in the apparatus and methods indicated above, and changes may be made with respect to the features disclosed, provided that the elements set forth in the following claims or the equivalents of such be employed.

What is claimed is:

1. Apparatus for introducing particulate material into a chamber, comprising a chamber adapted to contain gas at a predetermined pressure; downwardly extending conduit means adapted to have particulate material flow downwardly therethrough into said chamber in a path of flow, said conduit means being connected in gas-tight relation to said chamber and having an opening that opens into said chamber; material-holding means adapted to be located in closed position in which it extends across said conduit means above said opening to prevent flow of particulate material through said conduit means into said chamber, and adapted to be located in open position in which it permits flow of material through said conduit means toward said chamber; gas valve means located below said material holding valve means and having closure means adapted to be located in closed position, to form a gas-tight seal at said opening into said chamber, and adapted to be retracted to opened position to permit particulate material to flow from said conduit means into said chamber without contacting said closure means of said gas valve means when said material holding valve means is opened, said closure means being adapted to move between its opened and closed positions through a space in said chamber below said opening; and clearing means for conveying material in one position and for clearing material in another position, said clearing means being adapted to be moved after said material holding valve means is closed and while said gas valve means is opened to insure that said space through which said closure means of said gas valve means moves between its opened and closed positions is free of particulate material that could impair formation of a gas tight seal by said closure means of said gas valve means.

2. Apparatus for introducing particulate material into a chamber, comprising a chamber adapted to contain gas at a predetermined pressure; downwardly extending conduit means adapted to have particulate material flow downwardly therethrough into said chamber in a path of flow, said conduit mens being connected in gas-tight relation to said chamber and having an opening that opens into said chamber; material-holding valve means adapted to be located in closed position in which it extends across said conduit means above said opening to prevent flow of particulate material through said conduit means into said chamber, and adapted to be located in open position in which it permits flow of material through said conduit means toward said chamber; gas valve means located below said material holding valve means and having seat means and closure mens adapted to be located in closed position in contact with said seat means to form a gas tight seal at said opening into said chamber, and adapted to be retracted to opened position to permit particulate material to flow through said opened gas valve means from said conduit mens into said chamber without contacting said closure means of said gas valve means when said material holding valve means is opened, said closure means being adapted to move between its opened and closed positions through a space in said chamber below said opening; and protective means for conveying material in one position and for clearing material in another position, said protective means being adapted to be moved to a position below said gas valve means after said material holding valve means is closed and while said closure means of said gas valve means is retracted to its opened position to prevent particulate material flowing through said opened gas valve means after said material holding valve means is opened from contacting said seat means and said retracted closure means of said gas valve means, and to be moved away from said position below said gas valve means to insure that said space through which said closure means of said gas valve means moves between its opened and closed positions is free of particulate material that could impair formation of a gas-tight seal by said closure means of said gas valve means.

3. The apparatus of claim 1 in which, when said gas valve closure means is in its opened position, said clearing means comprises means forming a conduit extending below said opening into the upper portion of said chamber and forming an extension of said conduit means that is above said opening, which conduit-forming means is adapted to be moved laterally away from said location beneath said opening after said material holding valve means is closed to prevent flow of particulate material, to remove particulate material contained within said conduit formed by said conduit forming means and to clear particulate material from said space through which said closure means of said gas valve moves from its opened position to its closed position.

4. The apparatus of claim 1 in which said clearing means is adapted to be positioned adjacent said path of flow of particulate material and to be moved laterally across said path of flow to a lateral position away from said path of flow to clear away particulate material from the space through which said closure means of said gas valve means moves.

5. The apparatus of claim 1 comprising a second chamber adapted to have therein gas at a pressure other than atmospheric, said second chamber being below said first mentioned chamber; downwardly extending conduit means extending between said first mentioned chamber and said second chamber adapted to have particulate material flow downwardly therethrough from said first-mentioned chamber to said second chamber in a generally fixed second path of flow, said conduit means being connected in gas-tight relation to both said chambers and having a second opening that opens into said second chamber; second material-holding valve means adapted to be located in closed position to extend across said second conduit means above said opening into said second chamber to prevent flow of particulate material through said second chamber, and adapted to be located in opened, position in which it permits flow of material through said second conduit means into said second chamber; second gas valve means located below said second material-holding valve means and having closure means adapted to be located in closed position to form a gas-tight seal and said second opening into said second chamber and adapted to be retracted to opened position to permit particulate material to flow from said second conduit means into said second chamber without contacting said closure means of said second gas valve means when said second material holding valves means is opened, said closure means of said second gas valve means being adapted to move between its opened and closed positions through a space in said second chamber below said second opening; and second clearing means for conveying material in one position and for clearing material in another position, said second clearing means being adapted to be moved after said second material holding valve means is closed and while said second gas valve means is opened to insure that said space through which said closure means of said second gas valve means moves between its opened and closed positions is free of particulate material that could impair formation of a gas-tight seal by said closure means.

6. The apparatus of claim 5 in which said second clearing means is adapted to be positioned adjacent said second path of flow of particulate material and to be moved laterally across said second path of flow to a lateral position away from said path of flow to clear away particulate material from the space through which said second closure means of said second gas valve means moves.

7. The apparatus of claim 5 in which, when said second gas valve closure means is in its opened position, said second clearing means comprises means forming a clearing conduit extending below said second opening into the upper portion of said second chamber and forming an extension of said second conduit means that is above said second opening, which means for forming said clearing conduit is adapted to be moved laterally away from said location beneath said second opening after said second material holding valve means is closed to prevent flow of particulate material to remove particulate material contained within said second conduit formed by said clearing conduit forming means and to clear particulate material from said space through which said closure means of said second gas valve moves from its opened position to its closed position.

8. The apparatus of claim 1 in which said clearing means comprises a sleeve adapted to be moved bodily laterally between a position beneath said opening and surrounding said path of flow and a position laterally removed from said opening and said path of flow.

9. The apparatus of claim 5 in which each of said clearing means comprises a sleeve adapted to be moved bodily laterally between a position beneath the opening with which the clearing means is associated and surrounding the path of flow through said opening, and a position laterally removed from said opening and said path of flow.

10. The apparatus of claim 1 in which said clearing means comprises vane means for sweeping particulate material laterally as said clearing means is bodily moved from said position beneath said opening to said laterally removed position.

11. The apparatus of claim 8 in which said sleeve carries vane means for sweeping particulate material laterally as said sleeve is bodily moved from a position beneath its associated opening to said laterally removed position.

12. The apparatus of claim 1 in which said clearing means comprises a plurality of parts adapted to be separated from each other while in said position laterally removed from said opening and to be brought together to form a sleeve beneath said opening for the purpose of conducting particulate material.

13. The apparatus of claim 5 in which each of said clearing means comprises a plurality of parts adapted to be separated from each other while in said position laterally removed from said opening and to be brought together to form a sleeve beneath said opening for the purpose of conducting particulate material.

14. The apparatus of claim 4 comprising means for automatically and sequentially opening said gas valve means, moving said clearing means from its said lateral position to said position adjacent said path of flow, and opening said material holding valve means.

15. The apparatus of claim 4 comprising means for automatically and sequentially closing said material holding valve means, moving said clearance means to its lateral position to clear the space below said gas valve means, and closing said gas valve means.

16. The apparatus of claim 14 comprising means for automatically closing said material holding valve means moving said clearing means to its lateral position to clear the space below said gas valve means, and closing said gas valve means.

17. The apparatus of claim 6 comprising means comprising means for automatically sequentially opening said second gas valve means moving said second clearing means from its said lateral position to said position adjacent said path of flow, and opening said second material holding valve means.

18. The apparatus of claim 6 comprising means for automatically and sequentially closing said second material holding valve means, moving said clearing means to its lateral position to clear the space below said second gas valve means, and closing said second gas valve means.

19. The apparatus of claim 7 in whicch each of said valve means comprises means for automatically and at predetermined times closing said material holding valve means, moving said clearance means to its said lateral position to clear the space beneath said gas valve means, and closing said gas valve means.

20. The apparatus of claim 16 comprising means operating at intervals determined by the flow of said material for automatically carrying out said operations of said valve means and said clearing means.

21. The apparatus of claim 16 comprising means operating at predetermined time intervals for automatically operating of said valve means and said clearing means.

22. The apparatus of claim 21 comprising programmed control means for controlling said automatic operation.

23. The apparatus of claim 2 in which, when said gas valve closure means is in its opened position, said protective means comprises means adapted to form a conduit that extends below said gas valve means while its closure means is retracted to its opened position and that forms an extension of said conduit means that is above said opening, which conduit-forming means is adapted to be moved laterally away from below said gas valve means opening after said material holding valve means is closed to prevent flow of particulate material, to remove particulate material contained within said conduit formed by said conduit forming means and to clear particulate material from said space through which said closure means of said gas valve moves from its opened position to its closed position.

24. The apparatus of claim 2 in which said protective means is adapted to be positioned adjacent said path of flow of particulate material and to be moved laterally across said path of flow to a lateral position away from said path of flow to clear away particulate material from the space through which said closure means of said gas valve means moves.

25. The apparatus of claim 2 comprising a second chamber adapted to have therein gas at a pressure other than atmospheric, said second chamber being below said first mentioned chamber; downwardly extending conduit means extending between said first-mentioned chamber and said second chamber adapted to have particulate material flow downwardly therethrough from said first-mentioned chamber to said second chamber in a generally fixed second path of flow, said conduit means being connected in gas-tight relation to both said chambers and having a second opening that opens into said second chamber; second material-holding valve means adapted to be located in closed position to extend across said second conduit means above said second opening into said second chamber to prevent flow of particulate material through said second conduit means into said second chamber, and adapted to be located in opened position in which it permits flow of material through said second conduit means into said second chamber second gas valve means located below said second materialholding valve means and having closure means adapted to be located in closed position to form a gas-tight seal at said second opening into said second chamber and adapted to be retracted to opened position to permit particulate material to flow through said opened second gas valve means from said second conduit means into said second chamber without contacting said closure means of said second gas valve means when said second material holding valve means is opened, said closure means of said second gas valve means being adapted to move between its opened and closed positions through a space in said second chamber below said second opening; and second protective means for conveying material in one position and for clearing material in another position, said second protective means being adapted to be moved to a position below said second gas valve means after said second material holding valve means is closed and while said closure means of said second gas valve means is retracted to its opened position to prevent particulate material flowing through said opened gas valve means after said second material holding valve means is opened from contacting said seat means and said retracted closure means of said second gas valve means, and to insure that said space through which said closure means of sid second gas valve means moves between its opened and closed positions is free of particulate material that could impair formation of a gas-tight seal by said closure means.

26. The apparatus of claim 25 in which, when said second gas valve closure means is in its opened position, said second protective means comprises means forming a protective conduit extending below said second opening into the upper portion of said second chamber and forming an extension of said second conduit means that is above said second opening, which means for forming said protective conduit is adapted to be moved laterally away from said location beneath said second opening after said second material holding valve means is closed to prevent flow of particulate material to remove particulate material contained within said protective conduit formed by said conduit forming means and to clear particulate material from said space through which closure means of said second gas valve moves from its opened position to its closed position.

27. The apparatus of claim 1 ccomprising means for sensing the presence of particulate material at a predetermined level in said chamber; and means actuated from said sensing means for actuating said material holding valve means, said clearing means, and said gas valve means.

28. The apparatus of claim 1 comprising a second chamber into which particulate material is discharged from said first chamber and means for discharging a substantially continuous flow of material from said second chamber, and in which apparatus said clearing means is adapted to be positioned adjacent said path of flow of said particulate material and to be moved laterally across said path of flow, and in which, when said material holding valve means and said gas valve means are opened and said clearing means is located adjacent said path of flow, and when the level of particulate material in said chamber rises to a predetermined level and actuates said sensing means, means actuated from said discharging means sequentially causes said material holding valve means to close and prevent flow of particulate material, said clearing means to move laterally across the path of flow of particulate material to sweep particulate material away from the space through which said closure means of said gas valve means moves, and to close said gas valve means.

29. The apparatus of claim 5 in which each of said first-mentioned and said second clearing means is adapted to be positioned adjacent its path of flow of particulate material and to be moved laterally across its path of flow, and which comprises means for substantially continuously discharging particulate material from said second chamber; and control means actuated from said discharging mean when said material-holding means and said gas valve are opened and said first mentioned clearing means is located adjacent said first mentioned path of flow, for actuating, in sequence, said first mentioned material-holding valve means to close and prevent flow of particulate material, said first mentioned clearing means to move laterally across the said first mentioned path of flow into said first mentioned chamber to sweep particulate material away from the space through which said closure means of said first mentioned gas valve means moves, and to close said first-mentioned gas valve means, and thereafter when said second material holding valve means and said second gas valve means are opened and said second clearing means is located adjacent said second path of flow, for actuating, in sequence, said second material holding valve means to close and prevent flow of particulate material, said second clearing means to move laterally across said second path of flow to sweep particulate material away from the space through which said closure means of said second gas valve means moves, and to close said second gas valve means.

30. The apparatus of claim 27 in which said clearing means is adapted to be positioned adjacent said path of flow of said particulate material and to be moved laterally across said path of flow, and in which, when said material holding valve means and said gas valve means are opened and said clearing means is located adjacent said path of flow, and when the level of particulate material in said chamber rises to a predetermined level and actuates said sensing means, said means actuated from said sensing means sequentially causes said material holding valve means to close and prevent flow of particulate material, said clearing means to move laterally across the path of flow of particulate material to sweep particulate material away from the space through which said closure means of said gas valve means moves, and to close said gas valve means.

31. The apparatus of claim 27 in which said clearing means is adapted to be positioned adjacent said path of flow of said particulate material and to be moved laterally across said path of flow, and in which, when said material holding valve means and said gas valve means are opened and said clearing means is located adjacent said path of flow, and when the level of particulate material in said chamber falls below a predetermined level and actuates said sensing means, said mean actuated from said sensing means sequentially causes said material holding valve means to close to prevent flow of particulate material, said clearing means to move laterally across the path of flow of particulate material to sweep particulate material away from the space through which said closure means of said gas valve means moves, and to closue said gas valve means.

32. The apparatus of claim 5 in which each of said first mentioned and said second clearing means is adapted to be positioned adjacent its path of flow of particulate material and to be moved laterally across its path of flow, and which comprises first means for sensing the presence of particulate material at a predetermined level in said first-mentioned chamber; first means actuated from said first sensing means, when said material holding means and said gas valve are opened and said first mentioned clearing means is located adjacent said first mentioned path of flow, and when the level of particulate material in said first mentioned chamber rises to a predetermined level for actuating, in sequence, said first-mentioned material-holding valve means to close and prevent flow of particulate material, said first mentioned clearing means to move laterally across the said first mentioned path of flow into said first mentioned chamber to sweep particulate material away from the space through which said closure means of said first mentioned gas valve means moves, and to close said first mentioned gas valve means; second means for sensing the presence of particulate material at a predetermined level in said second chamber; and second means actuated from said second sensing means, when said second material holding valve means and said second gas valve means are opened and said second clearing means is located adjacent said second path of flow and when the level of particulate material in said second chamber falls below a predetermined level, for actuating, in sequence, said second material holding valve means to close and prevent flow of particulate material said second clearing means to move laterially across said second path of flow to sweep particulate material away from the space through which said closure means of said second gas valve means moves, and to close said second gas valve means.

* * * * *

UNITED STATES PATENT AND TRADEMARK OFFICE
CERTIFICATE OF CORRECTION

PATENT NO. : 4,089,429
DATED : May 16, 1978
INVENTOR(S) : Arthur J. Stock, Reeve R. Hastings It is certified that error appears in the above—identified patent and that said Letters Patent are hereby corrected as shown below:

Column 15 (claim 5) line 58, before "opening" insert --second--; line 59, before "chamber" insert --conduit means into said second--; line 60, delete the comma.

Signed and Sealed this

Thirty-first Day of October 1978

[SEAL]

Attest:

RUTH C. MASON
Attesting Officer

DONALD W. BANNER
Commissioner of Patents and Trademarks